(12) United States Patent
Wiebel-Herboth et al.

(10) Patent No.: US 10,636,301 B2
(45) Date of Patent: Apr. 28, 2020

(54) METHOD FOR ASSISTING OPERATION OF AN EGO-VEHICLE, METHOD FOR ASSISTING OTHER TRAFFIC PARTICIPANTS AND CORRESPONDING ASSISTANCE SYSTEMS AND VEHICLES

(71) Applicant: HONDA RESEARCH INSTITUTE EUROPE GMBH, Offenbach am Main (DE)

(72) Inventors: Christiane Wiebel-Herboth, Offenbach (DE); Matti Kruger, Offenbach (DE)

(73) Assignee: HONDA RESEARCH INSTITUTE EUROPE GMBH, Offenbach am Main (DE)

( * ) Notice: Subject to any disclaimer, the term of this patent is extended or adjusted under 35 U.S.C. 154(b) by 0 days.

(21) Appl. No.: 16/353,571

(22) Filed: Mar. 14, 2019

(65) Prior Publication Data

US 2019/0287397 A1   Sep. 19, 2019

(30) Foreign Application Priority Data

Mar. 14, 2018  (EP) ..................................... 18161781

(51) Int. Cl.
*G08G 1/09*   (2006.01)
*B60Q 9/00*   (2006.01)
(Continued)

(52) U.S. Cl.
CPC ............. *G08G 1/091* (2013.01); *B60Q 1/50* (2013.01); *B60Q 1/525* (2013.01); *B60Q 9/00* (2013.01);
(Continued)

(58) Field of Classification Search
None
See application file for complete search history.

(56) References Cited

U.S. PATENT DOCUMENTS 9,466,144 B2 * 10/2016 Sharp ...................... G06T 15/04
9,711,044 B2 *  7/2017 Relyea ................... G08G 1/094
(Continued)

FOREIGN PATENT DOCUMENTS

EP       2 821 978 A1    1/2015
EP       2 307 980 B1    8/2016
WO    WO-2016209423 A1 * 12/2016 ............. B60Q 9/008

*Primary Examiner* — Fekadeselassie Girma
(74) *Attorney, Agent, or Firm* — Squire Patton Boggs (US) LLP

(57) ABSTRACT

A method for assisting operation of an ego-vehicle in addressing a dynamic environment in which at least one further traffic object is present, an assistance system and a vehicle are provided. Information on the presence of the at least one other traffic object in the environment of the ego-vehicle is obtained. Then, information whether the other traffic participant has detected the ego-vehicle is obtained. Based on this information, a signal including information about whether the other traffic participant has detected the ego-vehicle is generated and supplied to an output device. An output signal is output based on the information whether the other traffic participant has detected the ego-vehicle, such that a parameter of the output signal is indicative of a detection probability of the detection of the ego-vehicle by the other traffic participant, an elapsed time since the detection and/or a complexity of the dynamic environment.

13 Claims, 7 Drawing Sheets

(51) Int. Cl.
- G06K 9/00 (2006.01)
- G08G 1/0967 (2006.01)
- B60Q 1/52 (2006.01)
- G08G 1/16 (2006.01)
- B60Q 1/50 (2006.01)

(52) U.S. Cl.
CPC ......... B60Q 9/008 (2013.01); G06K 9/00805 (2013.01); G08G 1/096716 (2013.01); G08G 1/096725 (2013.01); G08G 1/096758 (2013.01); G08G 1/096791 (2013.01); G08G 1/163 (2013.01); G08G 1/166 (2013.01)

(56) References Cited

U.S. PATENT DOCUMENTS

| | | | | |
|---|---|---|---|---|
| 10,017,114 | B2* | 7/2018 | Bongwald | G02B 27/0093 |
| 10,127,463 | B2* | 11/2018 | Fursich | H04N 13/239 |
| 10,195,995 | B2* | 2/2019 | Boehm | B60R 1/12 |
| 10,204,261 | B2* | 2/2019 | Haley | G06K 9/00845 |
| 10,322,682 | B2* | 6/2019 | Faist | B60R 11/0264 |
| 10,324,297 | B2* | 6/2019 | Kunze | G02B 27/0179 |
| 10,373,415 | B2* | 8/2019 | Atsumi | G07C 1/32 |
| 10,384,641 | B2* | 8/2019 | McNabb | B60R 25/01 |
| 10,401,621 | B2* | 9/2019 | Wierich | G02B 19/0014 |
| 10,430,676 | B2* | 10/2019 | Banno | A61B 5/1128 |
| 2002/0030611 | A1* | 3/2002 | Nuesser | G08G 1/092 340/992 |
| 2005/0196020 | A1* | 9/2005 | Comaniciu | G06K 9/00805 382/104 |
| 2005/0222716 | A1* | 10/2005 | Tengler | G01C 21/26 701/1 |
| 2008/0273752 | A1* | 11/2008 | Zhu | B60W 40/02 382/103 |
| 2010/0156906 | A1* | 6/2010 | Montgomery | G06T 15/205 345/427 |
| 2013/0050491 | A1* | 2/2013 | Lin | G08G 1/0962 348/148 |
| 2015/0009010 | A1* | 1/2015 | Biemer | G06F 21/32 340/5.83 |
| 2015/0112571 | A1* | 4/2015 | Schmudderich | B60W 30/08 701/93 |
| 2015/0166062 | A1* | 6/2015 | Johnson | B60W 30/12 701/41 |
| 2016/0137195 | A1* | 5/2016 | Takahashi | G08G 1/166 701/41 |
| 2016/0304092 | A1* | 10/2016 | Rebhan | B60W 30/16 |
| 2016/0318520 | A1* | 11/2016 | Bigdelou | B60W 50/08 |
| 2017/0132922 | A1* | 5/2017 | Gupta | G08G 1/0962 |
| 2017/0178322 | A1* | 6/2017 | Hakuk | G06K 9/52 |
| 2017/0274827 | A1* | 9/2017 | Lewis | G08G 1/167 |
| 2017/0309173 | A1* | 10/2017 | Heckmann | G08G 1/0112 |
| 2017/0365171 | A1* | 12/2017 | Haran | G01S 19/215 |
| 2018/0001766 | A1* | 1/2018 | McNew | G05D 1/0257 |
| 2018/0075309 | A1* | 3/2018 | Sathyanarayana | G06K 9/00335 |
| 2018/0162394 | A1* | 6/2018 | Kamiya | B60W 30/095 |
| 2018/0276485 | A1* | 9/2018 | Heck | G06Q 10/047 |
| 2018/0365772 | A1* | 12/2018 | Thompson | G06Q 40/08 |
| 2019/0108742 | A1* | 4/2019 | Stolbikov | G08B 19/00 |
| 2019/0188901 | A1* | 6/2019 | Herman | H04N 13/275 |
| 2019/0258251 | A1* | 8/2019 | Ditty | G05D 1/0088 |
| 2019/0310633 | A1* | 10/2019 | Toyoda | B60W 50/085 |

* cited by examiner

METHOD FOR ASSISTING OPERATION OF AN EGO-VEHICLE, METHOD FOR ASSISTING OTHER TRAFFIC PARTICIPANTS AND CORRESPONDING ASSISTANCE SYSTEMS AND VEHICLES

BACKGROUND

Field

The invention regards a method for assisting operation of an ego-vehicle, a method for assisting other traffic participants and corresponding assistance systems and vehicles including such assistance systems.

Description of the Related Art

In mobile scenarios such as road traffic scenarios with multiple traffic participants, overlooking other traffic participants by one traffic participant is a major reason for accidents. On the one hand, a traffic participant may crash into unrecognized other traffic participants due to erroneously treating them as available space. On the other hand, operation of an ego-vehicle, by either a human operator or an operating system in case of (partial) autonomous driving, may assume the recognition and understanding of the presence of the ego-vehicle and intentions of operation by other traffic participants and carry out maneuvers which, in case this assumption is wrong, increase accident risk.

Some attempts to improve driver's knowledge regarding information of other traffic participants, in particular drivers of other vehicles, have already been made. For example, EP 2 307 980 A1 discloses the concept for a driver initiated vehicle-to-vehicle warning device. According to this system, drivers can use this device to send anonymously warnings and messages to other nearby vehicles. The messages thereby contain information about the event observed by a driver or passenger such as location information. The receiving system uses this information in order to decide whether the driver should be alerted about the corresponding event. However, the value of the transmitted information is rather limited. First, whether information is forwarded to other vehicles depends on an individual estimation of the traffic participant, and second, only information about events that are perceived by the driver is communicated. However, as mentioned above, in many cases information about traffic objects that have not been recognized is even more valuable.

One approach to better inform the driver of an ego-vehicle about perception of other traffic participants is described in EP 2 821 978 A1. Here, a device for sharing an operation-state is disclosed. Driving skills and cognitive and judgement abilities of a driver are shared with other nearby drivers. Estimations of cognitive and judgement abilities are thereby in part determined from physiological measurements. For instance, eye-movements are analyzed to determine the degree of a driver's arousal which may be indicative for cognitive and judgement abilities. A separate unit is used to identify driving skill based on performance data such as steering angles.

The advantage of the system and device is, that a driver of an ego-vehicle who is informed about the capabilities and a general vigilance level of another traffic participant, may acquire a more accurate impression about whether the other traffic participant attentively monitors a traffic scene. Nevertheless, the ego-vehicle driver cannot be sure, if every vehicle, or any other traffic object, was in fact perceived by the other traffic participant. Many situations, where a dominant aspect draws all the attention of the other vehicle's driver, so that for example the ego-vehicle is overseen can be imagined. Additionally also situations, where the ego-vehicle or another traffic object is occluded for the other traffic participant, strongly limit the positive effect of such system.

SUMMARY

It is thus an object of the present invention to improve an information base that is used for making decisions while operating a vehicle.

The object is achieved by the invention according to the independent claims.

The general idea is that an operator who receives information about what other traffic participants know or do not know can make more informed and thus safer choices for maneuver planning compared to one who has to rely on assumptions more frequently. This is in particular the case if the information concerns the recognition of the own vehicle by others. Therefore, the main target of this invention is to enable an assistance system that, using the inventive method, provides this information about the recognition of the ego-vehicle by (an) other traffic participant(s) to the ego-vehicle operator and/or other traffic participants and thus potentially improves traffic flow and safety. It is to be noted, that a vehicle operator may either be a human operator like a driver, but also a machine/artificial operator such as for example a processor using a software program employed in autonomous or partially autonomous vehicles.

Furthermore, information about a) the perception of a traffic object in a traffic scene by a traffic participant as well as b) a lack thereof may in some instances initially provide information about the presence of others and can thus directly improve the operator's situation understanding.

According to the invention, operation of an ego-vehicle in a dynamic environment in which at least one further traffic participant is present is assisted. Information on the presence of the at least one other traffic participant in the environment of the ego-vehicle is obtained first. Then, information whether the other traffic participant has detected the ego-vehicle is obtained. This information may be obtained based on own sensing of the ego-vehicle or from a signal that is transmitted from the other traffic participant and/or one or multiple infrastructure element(s) or further vehicle(s) with the necessary information base. Thus, the other traffic participant either directly provides information of what is perceived or this information is obtained indirectly. When this information is compared to a knowledge base of the ego-vehicle about the traffic in its local environment, it can be determined whether the other traffic participant recognized other nearby traffic participants including the ego-vehicle. The term "knowledge base" is used to commonly refer to any information available to the ego-vehicle including information derived from own sensors, infrastructure elements, other vehicles and so on. A signal, which contains this information about whether the other traffic participant has detected the ego-vehicle and maybe also further traffic participants, is generated. The signal is then supplied to an output device and a human observable output signal is output. The output signal is based on the information whether the other traffic participant has detected the ego-vehicle, such that a perceivable saliency of the output signal is indicative of an uncertainty about the perception of the ego-vehicle by the other traffic participant. The perceivable saliency of the output signal is generated by modulating a parameter of the output signal. The uncertainty about the perception of the ego-vehicle by the other traffic participant bases on at least one of a detection probability of the detection of the ego-vehicle by the other traffic participant, an elapsed time since the detection of the ego-vehicle by the other traffic participant, and a complexity of the dynamic environment.

Thus, the generated signal includes the information whether the other traffic participant has detected the ego-vehicle. The output signal conveys the information whether the other traffic participant has detected the ego-vehicle and even conveys a detection probability about the detection of the ego-vehicle by the other traffic participant to a human user. The user is assisted by the inventive method.

Preferably, a perceivable saliency of the output signal conveys the information whether the other traffic participant has detected the ego-vehicle by modulating the parameter of the output signal.

The parameter of the output signal refers to a signal parameter of the output signal that is perceivable for a human. Perceivable means that modulating the parameter of the output signal is to be perceived by the user, by, for example, using visual, acoustic, or any other human sensing means ("perceivable saliency").

The detection probability for the detection of the ego-vehicle by the other traffic participant defines a measure of uncertainty whether the other traffic participant has detected the ego-vehicle.

The uncertainty about the perception may be a function of contextual factors such as an elapsed time since the detection of the other traffic participant or a scene complexity of the scene in the dynamic environment. The assistance of the user by the inventive method takes into regard that the scene in the dynamic environment may change and information about the presence and/or the location of the other traffic participant may be lost, for example, due to a memory decay, or outdated in the dynamically changing environment. Such a decay may additionally accelerate with increasing complexity of the dynamic environment.

It is to be noted that the information may also be propagated to other vehicles and/or infrastructure in order to improve the knowledge base(s) of other traffic participants and thereby further improve safety.

It is evident that execution of any driving maneuver may only be performed if the ego-vehicle is operated by a processor capable of generating control signals for autonomous driving, or at least partially autonomous driving.

As mentioned above, the information about whether the other traffic participant perceived further other traffic participants and/or the ego-vehicle, may be inferred within the ego vehicle, but also by the other traffic participant itself, another external processor or the shared processing power of multiple systems. Thus, the invention also regards detecting other traffic participants by one traffic participant and generating a signal including information on each detected other traffic participant, wherein the generated signal includes information on an uncertainty about the perception of each other traffic participant for each detected other traffic participant. The uncertainty about the perception of each other traffic participant bases on at least one of a detection probability of the detection of each other traffic participant, an elapsed time since the detection of the ego-vehicle by the other traffic participant, and a complexity of the dynamic environment. Then, this signal including the generated information is broadcast. It is thus possible on the one side that this other traffic participant generates a signal and broadcasts it, so that the further processing, including outputting the information, is performed at the ego-vehicle.

On the other hand, the other traffic participant may directly output an output signal that can be observed by a human operator of, for example, the ego-vehicle, but also by sensors like camera devices in the ego-vehicle. Thus, such system allows to improve safety in traffic situations even if the ego-vehicle has no capability to infer if the ego-vehicle or a further other traffic participant was perceived by the other traffic participant.

Advantageous aspects are defined in the subclaims.

It is for example preferred that the perceivable saliency of the output signal is indicative of an information that defines an estimated relevance of the traffic participant present in the environment of the ego-vehicle for operation of the ego-vehicle.

The estimated relevance refers to a measure describing how much the other traffic participant is predicted to influence a future evolvement of a current traffic scenario. The estimated relevance may be determined (estimated, predicted) by an advanced driver assistance system.

The perceivable saliency of the output signal is in particular be indicative of the uncertainty about the perception of the ego-vehicle by the other traffic participant. A maximum uncertainty may, e.g. be given when no perception of the ego-vehicle is communicated by the other traffic participant or determined by other means.

The method may comprise steps of supplying the generated signal to a driver assistance system, and of executing a driving maneuver based on the signal.

According to a further aspect, the output signal is indicative of a location or direction of the respective traffic participant relative to the ego-vehicle. This allows a driver to quickly perceive necessary information to fully understand a traffic situation and then decide on a suitable driving maneuver.

Furthermore, it is preferred, that an operator, in particular a human operator, of the ego-vehicle is able to request information about whether one of a plurality of other traffic participants has perceived the ego-vehicle, by designating a traffic participant of interest. In many cases, a driver has a good understanding of the overall traffic situation and does not necessarily require further input for successful task performance. However, sometimes there may still be uncertainty about the perception of particular traffic participants, which could be mitigated by the assistance function. Letting a driver specifically request information about the perception of a particular traffic participant, allows providing assistive information only when desired.

Preferably, the designation of a traffic participant of interest is made using gaze such that the traffic participant overtly attended at the time of request is designated. Using gaze means the designation is based on eye- and/or head movements of the ego-vehicle driver, which has the advantage that the driver does not have to make much additional input to the system that might distract his or her own attention and concentration on the primary task.

Alternatively, the designation is made using sound commands such as speech. Similar to the use of the gaze, inputting speech commands can be made very intuitive and therefore does not distract concentration too much.

According to another advantageous embodiment, the designation is made using gestures. The use of gestures for designating a traffic participant of interest but also for making a selection of one of a plurality of representations of traffic participants on a screen representing at least part of a current traffic scene for designation, which is also a preferred embodiment, has the advantage that misinterpretation is very unlikely. Thus, it is ensured that the information on perception of the ego-vehicle operator is given with respect to the correct other traffic participant. This is in particular advantageous in situations where many other traffic participants are present in the scene.

Of course, the system, set up for executing the inventive method, may offer a plurality of modalities for designating the other traffic participant and the driver of the ego-vehicle may choose from the offered options according to his preferences and/or the currently encountered traffic situation.

Further, it is advantageous, when the generated signal includes information on certainty of detection for each detected traffic participant. Such additional information can be used to mitigate over- or under-reliance, avoid misinterpretations by the ego-vehicle driver or a wrong reaction of an autonomous driving system.

The assistance system may also use information received from external sources. Such an external source might be, as previously indicated, the other traffic participant itself, but also a traffic infrastructure element or a further other traffic participant. The generated signal then includes information received from such external sources. Such additional information increases the knowledge base that is finally used to make a decision on a future driving maneuver.

In case that the other traffic participant detects further other traffic participants and/or the ego vehicle by itself, it is particularly preferred, that such identification of the ego-vehicle or further other traffic participant(s) is communicated with visual signals such as displays located in a vehicle's exterior or nearby infrastructure elements. This has the great advantage, that all traffic participants in the environment are informed of what was perceived by this traffic participant, regardless of whether they also have a (compatible) system mounted.

Nearby infrastructure elements are infrastructure elements in a vicinity of the ego-vehicle. Infrastructure elements in a vicinity of the ego-vehicle are infrastructure elements located within a predetermined distance from a current position and/or a predicted future position of the ego-vehicle in the traffic environment ("nearby infrastructure elements"). Infrastructure elements in a predetermined distance to the ego-vehicle may influence the future evolvement of the current traffic scenario or broadcast the information on detection of the ego-vehicle to the other traffic participants.

Preferred modalities for outputting the output signal comprise at least one of a visual signal, a sound signal, a tactile signal, a temperature signal, an electromagnetic signal, a chemical signal and a signal influencing the vestibular system of a human operator of the ego-vehicle.

To sum up, the core of the invention is providing information to a traffic participant such as the operator of an ego-vehicle, about whether its presence has been perceived or not been perceived by one or more other traffic participants operating in the ego-vehicle's environment. It is to be noted, that throughout the entire explanation of the invention, an operator can refer to biological (human) operator as well as artificial operator (e.g. processor executing software of autonomous or partially autonomous vehicles) operating in real or virtual environments. Variants of this invention adjust the communication of information on the basis of an (un-)certainty of having been perceived, the assumed potential severity associated with a lack of the respective information, or other measures of assumed relevance.

The information about whether another traffic participant has recognized the ego-vehicle or a further other traffic participant can be obtained from measurements made by the other traffic participant, sensors for monitoring the other traffic participant's operator (e.g. eye-tracking cameras), infrastructure elements, the ego vehicle or any combination of these.

BRIEF DESCRIPTION OF THE DRAWINGS

The invention and also further aspects and details will now be described using the annexed drawings in which.

DETAILED DESCRIPTION

Before details of the present invention are explained it is to be noted, that the invention comprises two major aspects, which in combination improve driving safety: The first aspect is the measurement, estimation and inference of the perception of further other traffic participants (including an ego vehicle) by another traffic participant, which can be summarized as obtaining information whether the other traffic participant has detected the ego-vehicle.

The second aspect regards the communication of the results from the first aspect to the ego-vehicle's operator in particular, or more general to any further other traffic participant and comprises generating a signal, which contains information about whether the other traffic participant has detected the ego-vehicle, supplying the signal to a driver assistance system and/or to an output device, and executing a driving maneuver and/or outputting a human observable output signal based on the signal. In addition, information about detection of others may also be provided.

Figure 1:
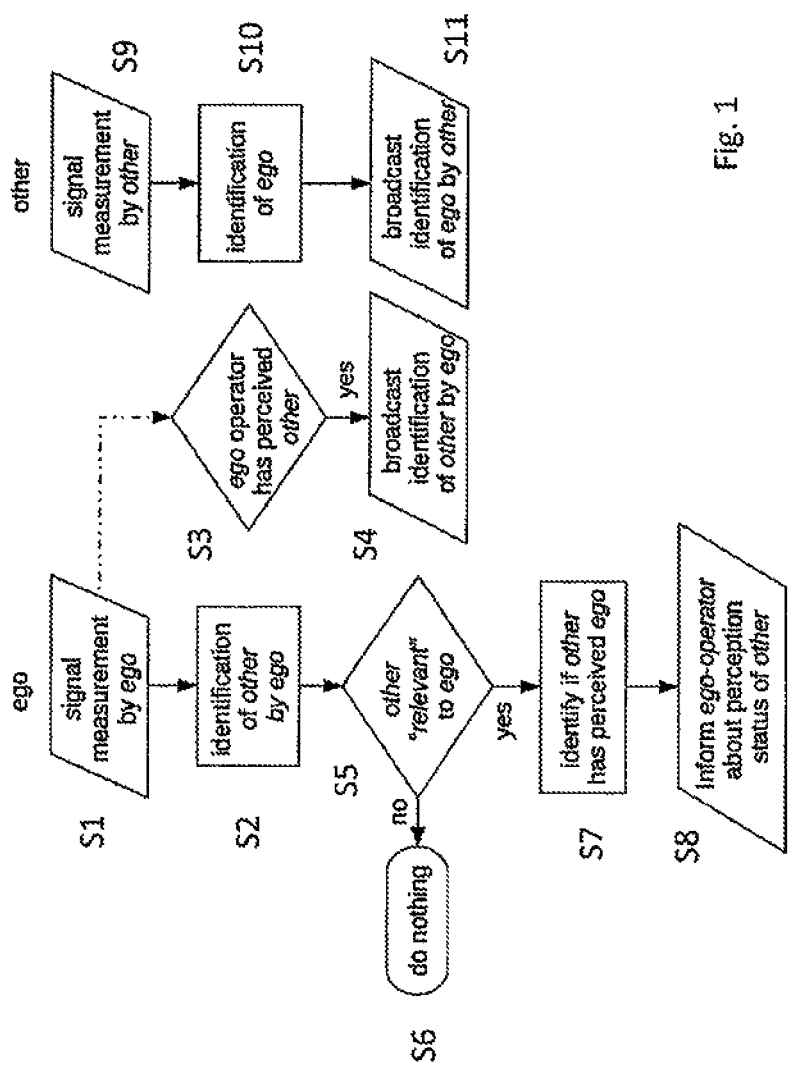
FIG. 1 shows a flowchart of the inventive method.

FIG. 1 shows a simplified flowchart, illustrating the method steps of the present invention. The term "ego" refers to the traffic participant associated with the assisted operator. The term "other" refers to the environmental traffic participant about whose perception information is obtained.

In step S1 the assistance system measures or receives signals indicative of the presence and perception of other traffic participants in the environment of the ego-vehicle including the ego-vehicle. The signal measurement or reception is performed by one or a plurality of sensors mounted on the ego-vehicle.

In step S2, another mobile entity (another traffic participant) is identified and thus the presence of such other traffic participant is determined. As indicated by the dotted arrow, depending on the perception status of the ego-vehicle (also identified in S1), an identification of another traffic participant by the ego-vehicle in step S3 may directly be broadcasted (step S4) to also facilitate the situation understanding of the other traffic participants. In that case, the ego-vehicle acts as another traffic participant and vice versa. It is to be noted that an action, execution, perception that is associated with the ego-vehicle is to be understood as being performed by an operator of the vehicle, which means by a driver or processor. The same is true for the other traffic object.

In step S5 it is determined, whether the identified traffic participant is relevant to the assisted operator. Relevance may be based on various criteria such as proximity, velocity, current and assumed future trajectory but could also be determined manually such as by an active ego-vehicle's operator request for information about, for instance, a particular environmental traffic participant, traffic participant class/category or direction.

If a recognized participant is classified as irrelevant, no signal is generated (S6). Otherwise, the system tries to determine, whether the other traffic participant has perceived the ego-vehicle in step S7. Details on the determination whether the other traffic participant perceived the ego-vehicle are explained later. Finally, a signal indicative of the determined perception status of the other traffic participant, which is information about whether the ego-vehicle was perceived, is generated. This signal may be supplied at least to a driver assistance system executing a driving function or to an output device to inform the driver of the ego-vehicle. Of course, a combination is also possible. In case that the driver shall be informed, an output device generates an output signal based on the generated signals (S8).

A component of the generated signal may for instance encode the certainty of having been perceived in an inverse manner such that an output signal is generated in which low certainty about whether the ego-vehicle has been perceived is communicated to the vehicle driver with high saliency and vice versa. Another signal component of the generated signal may be used to indicate the identity of the other traffic participant. This is achieved by converting this signal component to different symbols, relative stimulus locations, or perceived locations or directions for example when generating the output signal.

Another traffic participant (human operator or processor of an assistance system) samples information about the presence of further other traffic participants in its environment in step S10. These further other traffic participants include also the ego-vehicle, which may thus be detected by the other traffic participant. The detection of the ego-vehicle is broadcasted and/or presented by the other traffic participant so that the ego-vehicle operator can be informed more adequately about the detection of the ego-vehicle. Broadcasting means that a signal is transmitted by a transmitter of the other vehicle so that a corresponding receiver in the ego-vehicle can further process the information of the ego-vehicle being perceived by the other traffic participant. Alternatively or additionally, the perceived further other traffic participants, including the ego-vehicle, can be directly presented to the environment. Thus, in case that the ego-vehicle is operated by a driver (human operator), the driver can directly see whether his vehicle was perceived. But even an artificial operator could perceive such information, for example using image processing of images captured by a camera mounted on the ego-vehicle.

Figure 2:
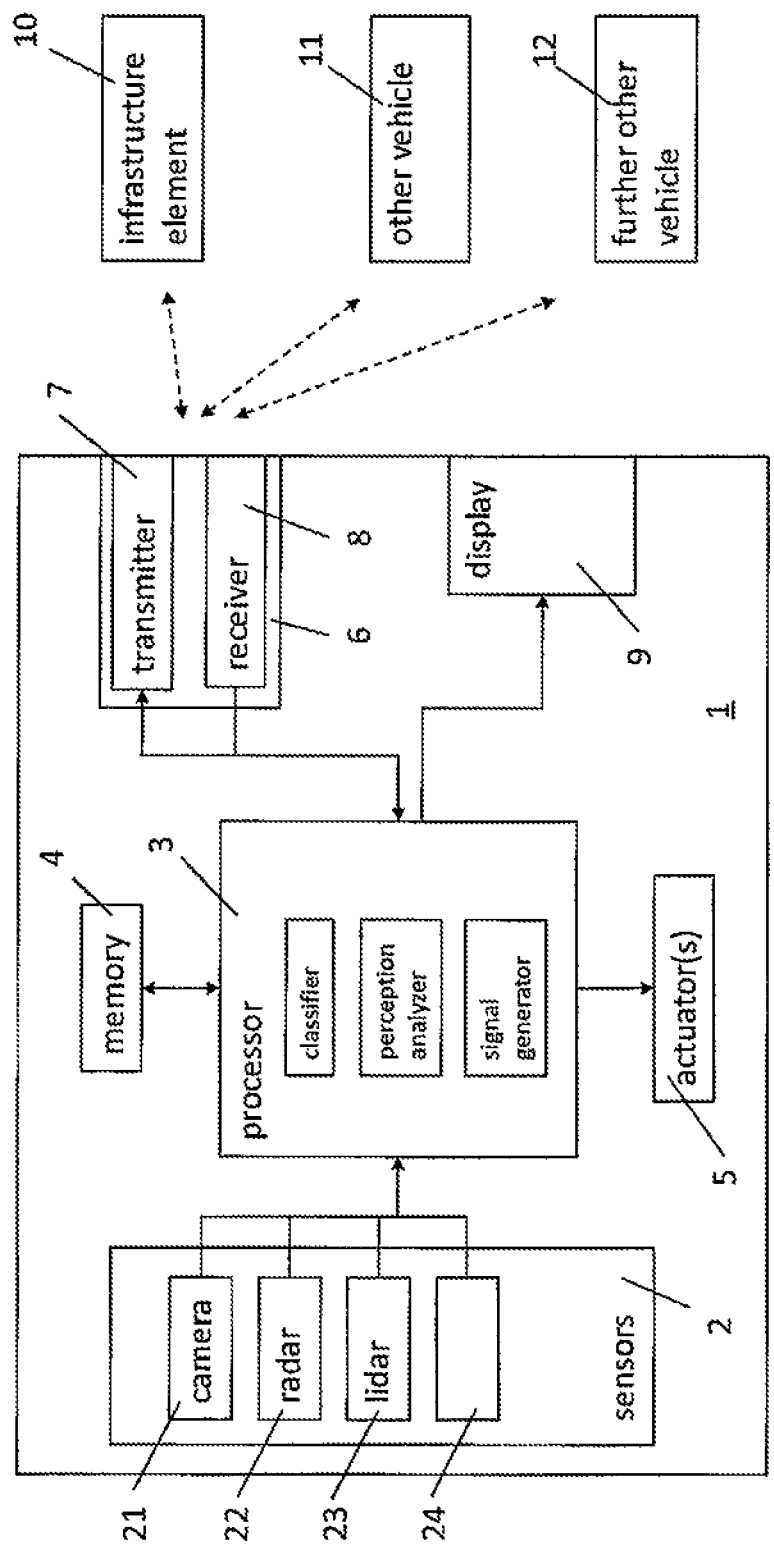
FIG. 2 shows a simplified diagram of the system's main components, FIG. 3a)-e) show examples of output signals output by the ego-vehicle, FIG. 4a), b) show examples where information on detected traffic participants is displayed to the environment by the traffic participant itself, and FIG. 5a), b) show examples using combined modalities of information output.

In FIG. 2, the system performing the method steps is shown. The entire system includes an ego-vehicle 2 and at least one other traffic participant, which is another vehicle 11 in the illustrated embodiment. Further, there may be at least one infrastructure element 10, which could be traffic lights or any other element or device that can be equipped with sensors and communication units in order to be connected to the ego-vehicle 1, the other traffic participant 11 and further other traffic participants 12. It is to be noted, that distinction between the ego-vehicle 1, the other traffic participant 11 and further other traffic participants 12 is made only to distinguish their specific roles in the explanation. Of course, all traffic participants, regardless of which type they are, may change their roles/simultaneously occupy multiple roles. Types of traffic participants are vehicles, cyclists, motorbikes, pedestrians, but also ships, aircrafts or any other entity that is operated in an environment where other participants may be present. The explanation in most cases refers to the entire unit, but it is self-explanatory that the entire unit consists of the vehicle itself and at least one of a human operator or an operating unit such as a processor for performing autonomous vehicle control.

Details of the involved traffic participants will now be explained with reference to the ego-vehicle 1 only for sake of conciseness.

The ego vehicle 1 of the illustrated embodiment comprises a plurality of sensors 2. Examples for sensors 2 are a radar sensor 2.1, a lidar sensor 2.2 and a camera 2.3. As indicated with sensor representative 2.4, further types of sensors may be mounted on the ego-vehicle 1. Further, a plurality of each of the sensors 2 may be used and any useful combination of types and number of sensors 2 may be realized.

The sensors 2 are connected to a processor 3. In the processor 3, the method steps for analyzing the sensor outputs are performed and a signal is generated. Based on this signal an output signal may be generated. Such output signal can be generated by a display 9 that may be mounted in the ego-vehicle 1 for displaying information to the ego-vehicle operator or such that the display is observable from outside the ego-vehicle 1 in order to inform other traffic participants 11 and 12.

It is to be noted that the display 9 is only one example for an output device. Examples for outputting information by different output devices will be given below for the exemplary traffic situation that might occur when driving on one of a plurality of lanes.

The signal generated in the processor 3 may also be supplied to an actuator 5 that is used for autonomous driving or partial autonomous driving. Using such actuator 5, for example, a brake system, throttle control or steering, the ego-vehicle 1 may perform a driving maneuver based on the signal.

The processor 3 is further connected to a memory 3 that is at least used for storing the executable programs used in the processor 3 for executing the method steps of the present invention.

In addition to the sensor signals, the processor 3 may receive information from external sources, such as infrastructure element 10 and/or the other traffic participant 11 and/or further other traffic participants(s) 12.

The invention can be applied in the form of a driver assistance system, which assists the driver of the ego-vehicle 1 in extracting safety-relevant information from the environment and thus indirectly in making more informed decisions. The assistance system contains a variety of modules, which are mainly realized in software, which is executed in the processor 3 based on signals received from the sensors 2.

One module for detecting and classifying other traffic participants based on information provided for instance by optical sensors like camera 21, radar 22 or lidar 23 is indicated by a "classifier" in FIG. 2. This module outputs the locations and potentially classification categories (e.g. car, pedestrian, cyclist) of nearby objects.

A further module is for obtaining information about whether or not the ego-vehicle 1 has been perceived by other recognized traffic participants 11. This module is designated "perception analyzer" in FIG. 2 and may employ different sub-modules depending on the category which the recognized traffic participants have been assigned to.

For pedestrians and cyclists, an estimation of the approximate field of view can be obtained from a camera-based pose estimation in relation to the environment. Thereby the assumption is made, that a person is more likely to perceive areas towards which the face is oriented than others. Combined with the temporal sequence of a person's head orientations in relation to the environment, estimates about which traffic participants have been perceived by that person can be made. When the ego-vehicle 1 is connected to a larger system of sensors employed for instance in other vehicles 11 and 12 or the environment, also information from these sensors may be used as a basis for perception estimation.

For the drivers of other cars as other traffic participants 11, an estimation of perceived objects can be obtained using a combination of on-board eye-/gaze-tracking and methods for scene and object recognition as described for the first module. This however would require special on-board technology which may not be available for all vehicles. In addition, indicators of perception are therefore also taken from internally measurable and/or externally observable vehicle behavior such as characteristic speed changes, avoidance behavior or a lack of response towards the ego-vehicle's actions. The required sensors may thereby be installed in any sufficiently nearby vehicle (including the ego-vehicle) or infrastructure elements.

The ego-vehicle 1 further comprises an interface 6 including a transmitter 7 for providing information to others and a receiver 8 for receiving information from other traffic participants 11, 12 and infrastructure 10 provided e.g. through radio transmission.

An output device provides perception inferences to the operator of the ego-vehicle 1 by interfacing with one or multiple of the available senses of the operator. Examples will be given when explaining FIGS. 3 to 5.

Perception inferences about the ego-vehicle's operator as well as about other operators, when additionally serving as a communication node in a network of traffic participants, may be broadcast using the communication interface 6. Such a broadcast could take place by means not directly observable to human operators (such as by radio transmission) for further propagation and presentation through on-board components on other vehicles but may in some embodiments also contain elements that are directly perceivable such as a visible display 9 on a car's exterior. This form of more direct human-perceivable communication would have the convenience of also informing traffic participants (including pedestrians) who have no dedicated artificial assistance system of the described type.

Further, the ego-vehicle 1 may have a module which enables operator requests for information about particular traffic participants and uses for instance speech, (deictic or pointing) gaze, gestures, or a combination of multiple modalities as input.

In the following, several possible procedures to infer information about whether the ego-vehicle 1 has been perceived by the other traffic participant are presented.

Various indicators for the perception of a traffic participant exist in case that the other traffic participant 11 is either a person (for example a pedestrian) or is operated by a person (vehicle driven by a person, for example car, bicycle, or any other mobile entity). One candidate feature comes from ocular behavior such as eye movements and fixations, which can provide information about the current focus of visual attention and/or head orientations, which can serve as a coarse estimation of the same. In both cases, an estimate of the current field of view can provide information about what has been visible and in the area of focus in that instance and consequently potentially be perceived. The indicators are derived from the sensor signals, for example, a camera 2.3 capturing images of a person.

Also behavior that does not directly relate to the sensory apparatus used mainly for environment perception can be valuable. For instance, traffic participants who make room such as a bicycle rider moving closer to the side of a road are likely to have perceived the entity they make room for. Conversely, blocking the way, closing a gap and speeding up in order to avoid being overtaken can be indicators of having been perceived by a less well-disposed contemporary. In a general sense, any measurable behavioral pattern that occurs with sufficient consistency in response to the presence of oneself might be exploited for estimating whether another agent has recognized one's presence.

Measurements of the states of possible indicators for the perception may be obtained through various means already available: like sensors 2 already mounted in the ego-vehicle 1 for other purposes. Head- and eye-tracking devices employed within a vehicle 1 could be used to infer the regions or even points of focus. Additionally, steering wheel and pedal behavior could be monitored and mapped to environmental information for measuring domain-specific behavioral indicators such as making room for another vehicle.

Especially for pedestrians, bicycle riders and other traffic participants, which are not concealed by their vehicles, sensors installed in the environment as well as sensors of other (connected) vehicles 11, 12 could be used to obtain information about a traffic participant's region and history of focus.

Combining this information with environmental information obtained from for instance vehicle-attached sensors, sensors in the infrastructure, dynamic databases or other vehicles could be used to map focus regions.

This mapping provides the basis for an estimation of what is being and has been perceived. The certainty about the perception of an entity of interest could be a function of the variables considered indicative of perception as well as their temporal sequence.

The uncertainty about the perception may be a function of a detection probability of the detection of the other traffic participants and/or one or more other contextual factors. Contextual factors may be an elapsed time since the detection of the other traffic participant or a scene complexity of the scene in the dynamic environment. A traffic scene in the dynamic environment may change with time and information about the presence or the location of the other traffic participant may be lost, for example, due to a memory decay. The information about the presence or the location of the other traffic participant can be outdated in the dynamically changing environment. A decay of the information may additionally accelerate with increasing complexity of the traffic scene in the dynamic environment.

In the case of machine/artificial operators, the functionality for an automatic estimate about whether or not an entity has been recognized corresponds partially to the functionality required for identifying traffic participants to whom information about recognition of their presence should be communicated. This could for instance be achieved using, radar-, lidar- or camera-based systems in combination with algorithms for object identification and classification. Alternatively, measurements may also be obtained using sensors employed in infrastructure elements 10 in which all recognized vehicles 1, 11, 12 that are connected to that infrastructure element 10 are informed about the presence of recognized vehicles.

In some situations such as in virtual environments, the knowledge about which traffic participant has perceived which other traffic participants may be pre-coded or be directly readable. Thereby both cases with full certainty as well as cases with associated uncertainties (for instance in the case of probabilistic programs or an artificial incentive for the operator to deal with uncertain information such as in vehicle simulator software) are possible.

Once it is determined whether the other traffic participant has perceived the ego-vehicle 1, the ego-vehicle operator has to be informed. The information whether the ego-vehicle 1 was perceived can be obtained by either evaluating sensor signals of the sensors 2 mounted on the ego-vehicle, but also (alternatively or additionally) by receiving information from external sources. Thus, when measurements or estimates are at least in part obtained from sources outside the ego-vehicle 1 whose operator should be informed about whether the ego-vehicle 1 has been perceived by the other traffic participant 11, a communication between the source(s) of information and the ego-vehicle 1 (or its operator) needs to be established.

This can happen on a basic level by directly providing human-observable signals, which presumably originate at the location of the perceiving or (non-)perceiving traffic participant 11 (including his or her vehicle). Means to achieve this would be letting the other traffic participants/vehicles 11 directly display what its operator has recognized through e.g. indicator lights or displays integrated in a vehicle's exterior. Furthermore, it is possible to include the information in a broadcast signal, which is broadcast and thus can be further processed by the ego-vehicle 1. In such a case, the ego-vehicle 1 will receive the broadcast signal for example via a vehicle mounted antenna and receiver 8. Based on the received broadcast signal artificial overlays in an observer's field of view may be generated by e.g. augmented reality displays.

In some scenarios, such signal transmission in ranges that lie outside human perceptual abilities such as through radio signals may be more practical because it is easier to provide targeted information and because it limits the risk of creating distractions or causing confusion for other traffic participants. Such signals can then be filtered and translated by an on-vehicle system or connected network service into a 'driver-readable' format.

Because it may not always be possible to judge the content of a traffic participant's perception with certainty, also a communication of uncertain information can be preferable. Sources of uncertainty can exist at all levels of perception estimation starting from each sensor's signal-to-noise ratio and continuing through the model, which relates the states of different indicators to the presence of "perception".

Additionally, also providing information about this (un-)certainty of having been perceived should in some embodiments be helpful for an operator because it allows him or her to make judgements about the extent to which the provided information may be trusted.

Depending on the use-case it can either be preferable to communicate a higher certainty of perception with a more salient output signal than a low certainty of perception or the other way around, i.e. increasing the output signal saliency as the certainty about having been perceived decreases. In a binary case, which only communicates the presence or lack of having been perceived, this would correspond to only one of the two cases being communicated.

In road traffic scenarios, the cases where the ego-vehicle 1 has not been seen by the nearby other traffic participant 11 can be argued to be more safety relevant for a driver because they require additional caution. Having been perceived by others on the other hand may often be the status quo and should, from a safety perspective, in these cases not be coupled to salient output signals which are potentially distracting or confusing. Note that especially the lack of a perception-signal from another vehicle may be seen as highly indicative of a lack of perception (assuming sufficient coverage of the here described assistance functionality) and thus potentially qualify for operator notification even more than cases in which a perception-signal has been received.

Besides or instead of recognition certainty, also other factors can be taken into account when modifying output signal saliency: One preferable option would be to covary the output signal saliency with the severity of the consequences, which a lack of recognition by a particular agent could entail. For instance, not having been seen by the operator of a fast approaching car from behind may be more severe than not having been seen by a quickly leaving car in the front.

Severity judgements could for instance rely on a classification of situations, a prediction of possible outcomes and potentially an estimation of the likelihood for each outcome as a weight for the assumed severity. In some embodiments, also the application of heuristics may be sufficient and appropriate for such judgements. Severity- and certainty measures may also be combined such that a severity-based saliency modulation is additionally weighted by the (un-)certainty of recognition.

In general, output signal saliency should ideally be coupled to the relevance, which the corresponding event has for an operator to adapt his or her behavior. When for instance driving along a crowd of pedestrians as other traffic participants, the pedestrians, which have not noticed one's vehicle, require special caution. Additionally or alternatively, within this selection, people who appear at higher risk of being involved in an accident (e.g. due to road proximity) or who appear to cause more damage when involved in an accident (e.g. due to a high potential impact speed) could be associated with a higher severity value. Indicating those pedestrians with more salient output signals helps an ego-vehicle operator to prioritize environment monitoring sensibly.

Furthermore, the traffic participants with respect to whose perception information is provided may in certain embodiments be limited to those for which an ego-vehicle operator has requested information.

The following keypoints contain examples for employing different modalities for output signals. Note that also combinations of these modalities may be implemented and vary based on contextual factors (including personal preferences). Further, it is evident that the generation of the signal in the processor 3 is adapted to cause the respective output device to realize the now explained modalities:

An augmented reality display within an ego vehicle's field of view could highlight a vehicle of interest (other traffic participant 11) having low probability of perception of the ego-vehicle 1 using e.g. specific colors, symbols or other image manipulations in the display region associated with the other traffic participant 11.

A head-up display (HUD), car-dashboard or other visual displays can be used to point out either the direction of (non-)perceiving traffic participants or illustrate the (approximate) location of the vehicle(s) of interest (other traffic participants 11) relative to the ego-vehicle 1.

Included saliency-modulating features should be chosen according to the respective set of use-cases but often features like luminance- and color contrasts are preferable saliency modulators. Saliency-modulating and attention-guiding features do not necessarily have to be consciously perceivable but can make use of (sub-conscious) low-level attention-guiding mechanisms such as feature "pop-out".

Information could be provided via sound signals using a speaker as an output device: In some (e.g. fast-paced) scenarios short sound stimuli which encode a direction of interest and can vary their perceived saliency by changing for instance volume, frequency or waveform could be used. Other scenarios may even permit the use of speech synthesis for more natural and easily interpretable interfacing with human operators.

Information could be provided via tactile signals as output signals. For instance, vibrations at an operator's steering instrument could encode location through their location relative to the operator and (un-)certainty and/or potential 'blindness-severity' through varying intensity, waveform or frequency. Depending on the use-case also other actuator arrangements such as in/on a seat, seat-belt or on a wearable tactile display can be feasible.

Information could be provided via temperature signals. For instance, a perceived temperature increase or decrease could be used to communicate a lack of perception and encode the potential severity through the magnitude of the increase/decrease. The location of the output signal could furthermore indicate the respective element's location in a similar manner as described above for tactile output signals.

Information could be provided via electromagnetic output signals capable of altering the activity of an operator's nervous system. This could for instance be achieved through magnetic induction such as in the case of transcranial magnetic stimulation, through the application of electric currents or by using light impulses in case of stimulating light sensitive biological tissue (e.g. optogenetically augmented). Parameters such as voltage, amplitude, magnetic excitation, field intensity, stimulus location, duration and frequency may serve to encode locations, certainty and severity estimates.

Information could be provided via chemical output signals capable of producing a reaction that results in an alteration of the activity of a user's nervous system. One or multiple parameters such as location, amount, frequency, duration and pattern of stimulation as well as chemical composition could be used to encode locations, certainty and severity estimates.

Information could be provided via output signals capable of influencing the vestibular system and correspondingly perception of spatial orientation and balance.

All means of communication could also be simplified by relinquishing the encoding of location or direction and, if required, just varying saliency-modulating parameters according to the respective (un-)certainty and/or assumed potential severity.

This could for instance be preferable when the operator already knows or can easily infer which other traffic participant the signal refers to because:
a) the operator either received this information via a different channel (other modality) or
b) the operator provided this information him/herself by making a request for a particular other traffic participant or direction or
c) because the functionality is contextually limited to a specific direction or type of object or
d) only one traffic participant which the signal could refer to is present or considered to be relevant.

As exemplified by a), multimodal interfaces allow for different modalities to serve as channels for complementary information. Vision could for example provide spatial information while the saliency of a tactile stimulus would encode the corresponding certainty-weighted potential severity.

Examples for embodiments of the described assistance function in which the driver of an ego-vehicle 1 is informed when another potentially relevant traffic participant 11 has not perceived ego-vehicle 1 will now be explained. The embodiments differ in terms of the interfaces (output devices) and output signals used to inform the driver.

Figure 3A:
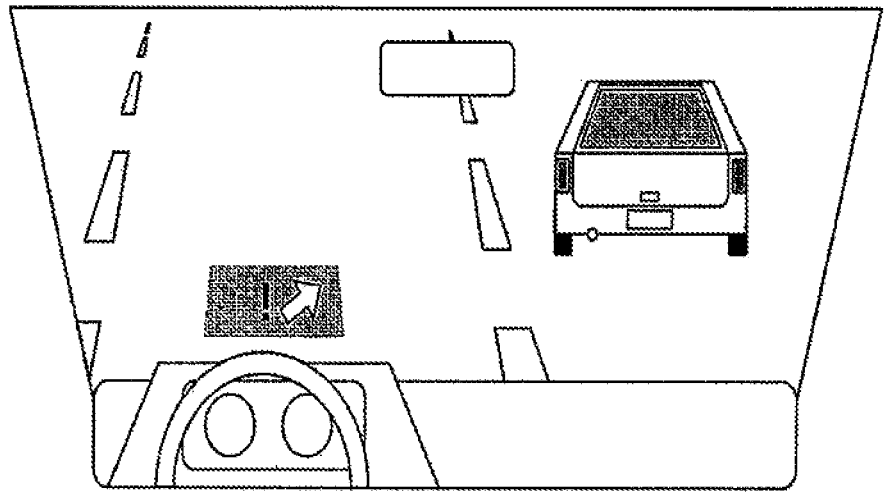

FIG. 3a) shows the use of symbols in a head-up-display (HUD) to inform the driver. The exclamation mark here serves as a warning symbol and the arrow points towards the other traffic participant 11, which the warning refers to.

Figure 3B:
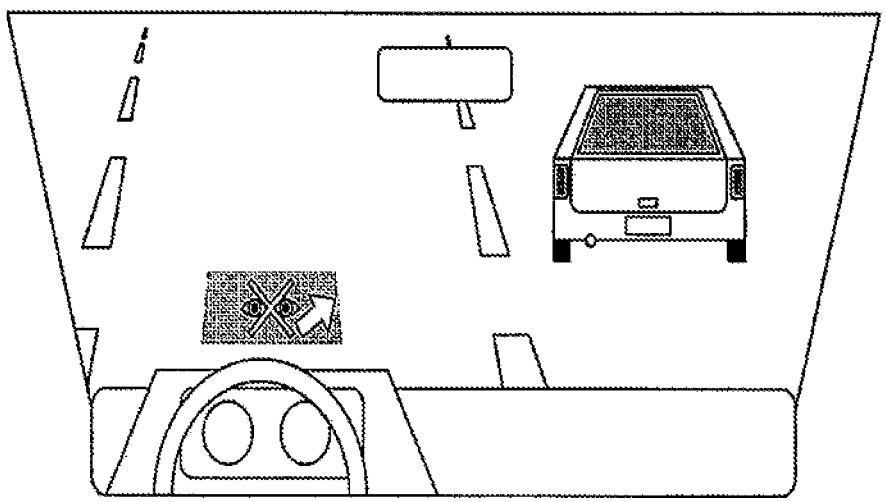

Rather than or in addition to general warning signals, also symbols that are directly indicative of the problem at hand may be used as illustrated in FIG. 3b). Here crossed-out eyes are used to intuitively indicate a lack of perception. The pictorial representation shown here is only an example that may be substituted in principle by any stimulus that yields the same relevant information.

Figure 3C:
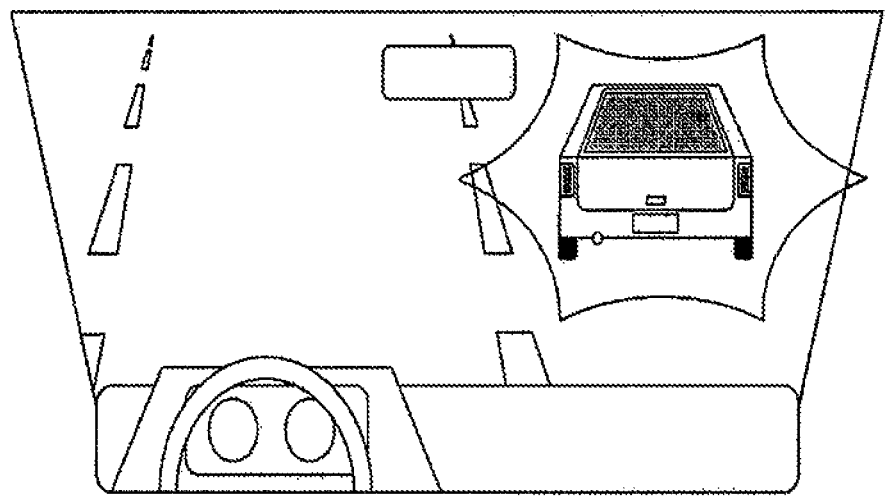

Also augmented reality solutions may be used to directly highlight a vehicle of interest in the driver's field of view with or without additional content indicative of the problem at hand. An example without additional content, thus only highlighting the other traffic participant 11 is shown in FIG. 3c).

Figure 3D:
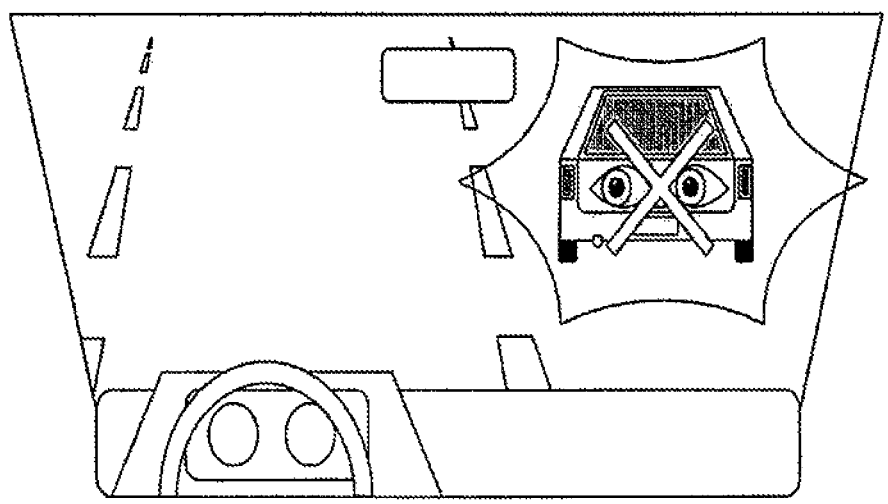

FIG. 3d) shows an augmented reality solution, which combines visually highlighting of another traffic participant 11 of interest with the presentation of additional content indicative of the problem at hand (not having been perceived) in the driver's field of view.

Figure 3E:
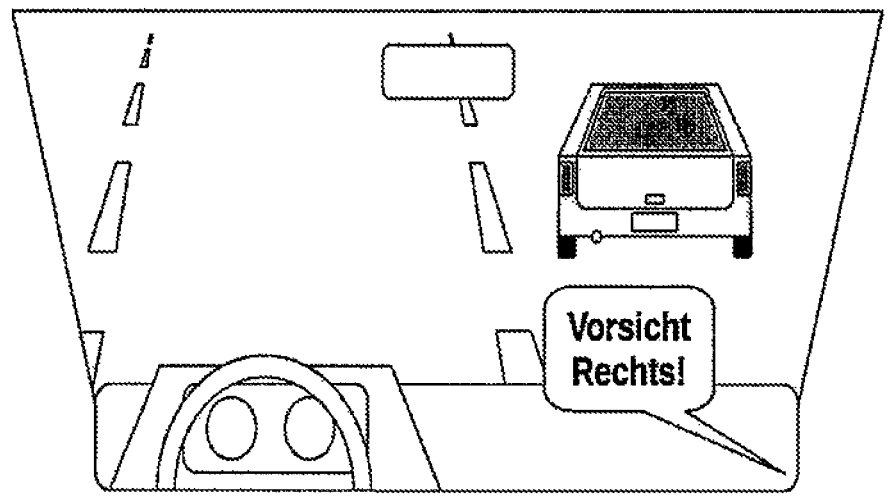

Also sound- and especially speech signals may be used to inform the driver on any level of detail using a speaker as an output device which is illustrated in FIG. 3e).

Figure 4A:
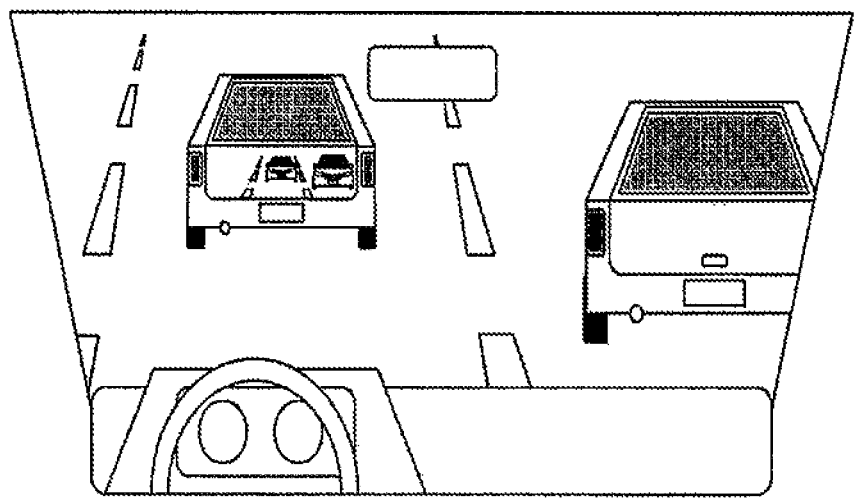

Examples for embodiments of a variant of the described assistance function in which a vehicle directly communicates the perception of its operator to other traffic participants is shown in FIGS. 4a) and b).

In the depicted examples, a vehicle's exterior is used to visually indicate which traffic participants its operator has perceived. Solutions may range from realistic "mirror"-like (FIG. 4a) to more schematic (FIG. 4b) representations and may also adapt to environmental variation to ensure perceivability.

FIG. 4a) shows a display used in or projected to a vehicle's exterior, which shows which traffic participants have been perceived by the vehicle's operator. FIG. 4a) also exemplifies a possible visually augmented reality variant when understood as a projection into the driver's field of view.

Figure 4B:
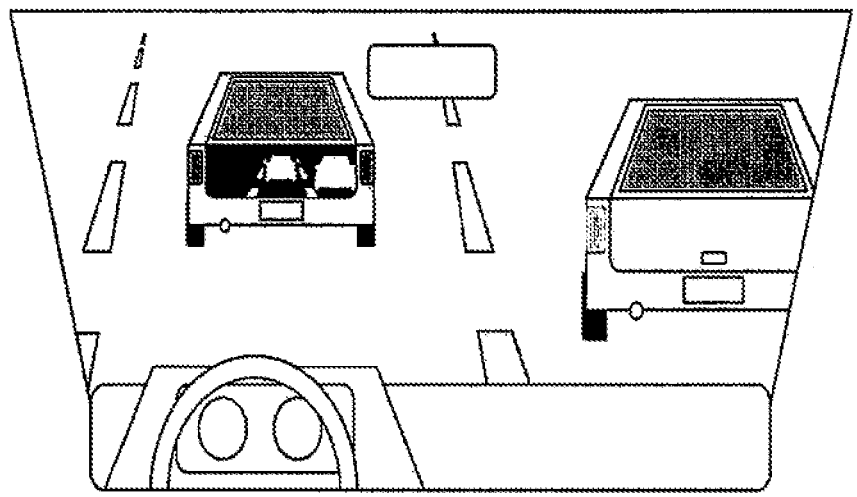

A display on a vehicle's exterior is depicted in FIG. 4b). It signals which traffic participants have been perceived by the vehicle's operator. In this example, only vehicle shapes are displayed with high contrast in order to facilitate visibility.

Figure 5A:
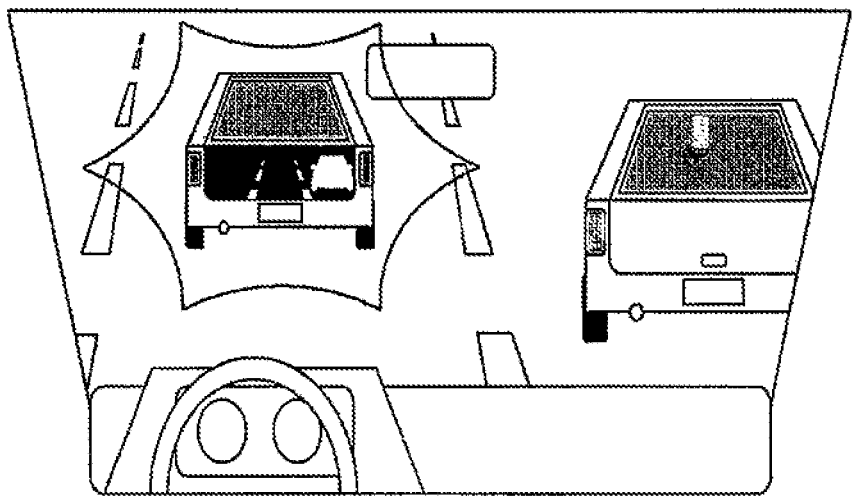

Note that also combinations of remote and local vehicle based communications may be feasible as shown in FIGS. 5a) and b).

FIG. 5a) combines a display on the vehicle's exterior and augmented reality highlighting of the traffic participant 11 of interest. Here the vehicle in front of the ego-vehicle 1 is highlighted because the operator of the vehicle in front appears not to have perceived the ego-vehicle 1 as indicated by the exterior display.

Figure 5B:
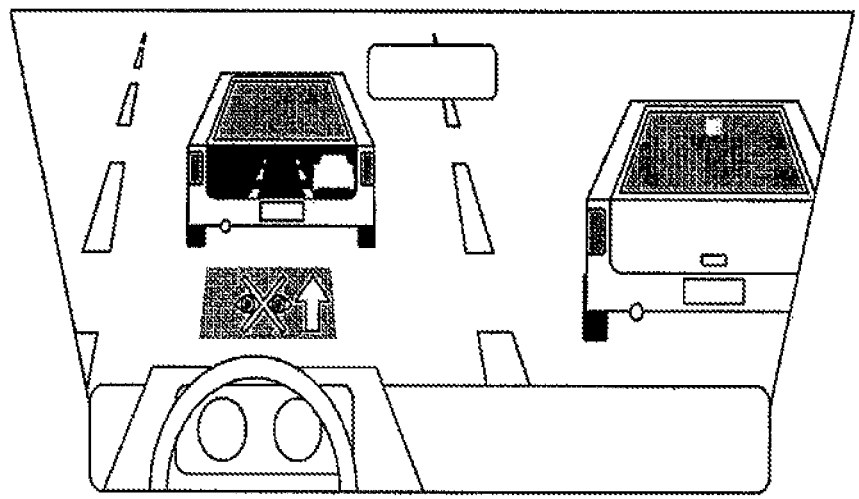

Finally FIG. 5b) shows an example for a combination of a display used in the vehicle's exterior and a HUD signal.

The use of the assistance may have positive effects on a user's situation assessment in dynamic scenarios in which entities may move relative to one another. This makes it particularly valuable in mobile scenarios such as riding a bike or motorcycle, driving a car, navigating a boat, ship or aircraft.

The examples and benefits are provided for illustrative purposes but are not meant to cover the whole scope of the invention or constrain its application to a particular set of use cases.

In a first example, pedestrians crossing a road are at risk of being overrun. Various factors can impede a person's perception of vehicles before and during an attempt to cross a street such as buildings, parking cars, vegetation and curves of the road. Playing children who want to retrieve a ball running off may not yet know how to scan carefully the road or wrongly prioritize their actions. Furthermore, especially with the advent of vehicles that are electrically powered, vehicles are becoming much more silent. This increases the requirements for drivers to pay attention to agents in their surrounding because they can no longer rely on their vehicle's noise broadcasting their arrival. A method, which supports a driver by providing information about which agents in particular are at risk, can help the driver to better accommodate this growing requirement and, even without silent vehicles, has the potential to generally improve safety.

Further, traffic roundabouts pose a particular risk for bicycle riders. For traffic participants inside a roundabout, the road curvature makes movement estimation of other traffic participants tricky with mirror use and also reduces the chance for the driver of a motorized vehicle to spot an approaching cyclist early on. In comparison to pedestrians, cyclists move at a higher speed and may thus not yet be visible at the time during which a driver of a car plans the maneuver to leave the roundabout but nevertheless reach the crosswalk at the same time as the car. For a cyclist, the road curvature of roundabouts can also make a recognition of vehicles and an estimation of their trajectories difficult. Vehicles within a roundabout are in circular motion and a violation of this pattern may seem less likely than its continuation, even with active indicator lights. Furthermore, the curvature can hide a vehicle on a roundabout from the field of view of a cyclist at certain times. Informing the operator of a vehicle about the lack of recognition by a cyclist has the advantages of a) informing the driver about the presence of the cyclist and b) making the driver pay particular attention to said cyclist.

Lane changing and overtaking can create situations of increased safety risk for multiple reasons. One possible danger originates in insufficient perception of a vehicle's surroundings. For instance, vehicles that are in a driver's blind spot are less likely to be recognized. Informing an overtaking driver that he has not been recognized by the operator of the vehicle, which he overtakes can trigger more careful behavior and reduce the risk of a crash in case the other vehicle attempts to change the lane.

Speeding drivers frequently misuse the high beam or even the horn to signal their presence to drivers who are presumably in their way. Such annoyances may be reduced when such drivers have information about whether or not they have already been noticed and in turn refrain from making aggressive announcements.

The proposed system is compatible with a variety of so called levels of automated driving as well as with scenarios involving mixtures of manually and autonomously controlled vehicles. The operator of a vehicle should be understood in a general sense such that it can refer to both a human as well as an artificial operator depending on who or what holds responsibility in a task.

Both artificial as well as human operators can benefit from an understanding of another traffic participant's perception. All previously described advantages for human operators should apply equally well to artificial operators because the dynamics of real world traffic require frequent decision-making that is based on knowledge about the current state of one's surroundings.

Additionally, the use of the system can be advantageous for scenarios in which control is shared or transferred between human and machine. When a human operator is informed about the lack of perception of other agents in an automated or partially automated mode, he or she can use this information to make corrective operations such as temporally limiting the set speed or increasing the gap size between vehicles. Furthermore, transfer between automation modes can be facilitated by having more situation aware drivers.

The invention claimed is:

1. A method for assisting operation of an ego-vehicle in addressing a dynamic environment in which at least one further traffic participant is present, the method comprising:
   obtaining information on presence of the at least one other traffic participant in the environment of the ego-vehicle,
   obtaining information whether the other traffic participant has detected the ego-vehicle,
   generating a signal which contains information about whether the other traffic participant has detected the ego-vehicle,
   supplying the signal to an output device, and
   outputting a human observable output signal based on the information whether the other traffic participant has detected the ego-vehicle, such that a perceivable saliency of the output signal is indicative of an uncertainty about the perception of the ego-vehicle by the other traffic participant,
   wherein a perceivable saliency of the output signal is generated by modulating a parameter of the output signal, and
   wherein the uncertainty about the perception of the ego-vehicle by the other traffic participant bases on at least one of a detection probability of the detection of the ego-vehicle by the other traffic participant, an elapsed time since the detection of the ego-vehicle by the other traffic participant, and a complexity of the dynamic environment.

2. The method according to claim 1, wherein
   the perceivable saliency of the output signal is indicative of an information that defines an estimated relevance of the other traffic participant present in the environment of the ego-vehicle for operation of the ego-vehicle,
   wherein the estimated relevance is a measure describing how much the other traffic participant is predicted to influence a future evolvement of a current traffic scenario.

3. The method according to claim 1, wherein
the method comprises steps of supplying the signal to a driver assistance system, and
executing a driving maneuver based on the signal.

4. The method according to claim 1, wherein
the output signal is indicative of a location or direction of the respective other traffic participant relative to the ego-vehicle.

5. The method according to claim 1, wherein
an operator of the ego-vehicle is able to request information about the perception state of one of a plurality of other traffic participants, including the perception of the ego-vehicle by the other traffic participant, by designating a traffic participant of interest.

6. The method according to claim 5, wherein
the designation is determined based on at least one of gaze such that the other traffic participant overtly attended at the time of request is designated, sound commands such as speech, gestures and a selection of one of a plurality of representations of traffic participants on a screen representing at least part of a current traffic scene.

7. The method according to claim 1, wherein
the output signal comprises at least one of a visual signal, a sound signal, a tactile signal, a temperature signal, an electromagnetic signal, a chemical signal and a signal influencing the vestibular system of a human operator of the ego-vehicle.

8. A method for assisting other traffic participants in an environment of an ego-vehicle comprising the steps of:
detecting at least one other traffic participant, and
generating a signal including information on each detected other traffic participant, wherein the generated signal includes information on an uncertainty about the perception of the other traffic participant for each detected other traffic participant,
wherein the uncertainty about the perception of the other traffic participant is based on at least one of a detection probability of the detection of the other traffic participant, an elapsed time since the detection of the other traffic participant, and a complexity of the dynamic environment, and
broadcasting the signal including the information and/or display the information on the detected other traffic participant to the environment of the ego-vehicle.

9. The method according to claim 8, wherein
information received from external sources about perception states and/or knowledge bases of the at least one other traffic participants in the local surroundings is propagated.

10. The method according to claim 8, wherein
the generated signal includes information received from external sources.

11. The method according to claim 8, wherein
detection of the other traffic participant is communicated with visual signals, in particular visual signals on displays located at an ego-vehicle's exterior or infrastructure elements in a vicinity of the ego-vehicle.

12. An assistance system for assisting operation of a vehicle, the system comprising
at least one sensor or a receiver,
a processor and further comprising
at least one display or transmitter,
wherein the assistance system is configured to perform the method according to claim 1.

13. A vehicle comprising an operation assistance system according to claim 12.

* * * * *